US009358644B2

(12) United States Patent
Heinrichsdorff et al.

(10) Patent No.: US 9,358,644 B2
(45) Date of Patent: Jun. 7, 2016

(54) METHOD FOR REPAIRING A DAMAGE POINT IN A CAST PART AND METHOD FOR PRODUCING A SUITABLE REPAIR MATERIAL

(75) Inventors: Frank Heinrichsdorff, Teltow (DE); Ursus Krüger, Berlin (DE); Ralph Reiche, Berlin (DE); Oliver Stier, Berlin (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 201 days.

(21) Appl. No.: 14/342,651

(22) PCT Filed: Aug. 23, 2012

(86) PCT No.: PCT/EP2012/066395
§ 371 (c)(1),
(2), (4) Date: Mar. 4, 2014

(87) PCT Pub. No.: WO2013/030075
PCT Pub. Date: Mar. 7, 2013

(65) Prior Publication Data
US 2014/0201964 A1 Jul. 24, 2014

(30) Foreign Application Priority Data
Sep. 1, 2011 (DE) .......................... 10 2011 081 998

(51) Int. Cl.
*B23P 6/00* (2006.01)
*B23P 6/04* (2006.01)
(Continued)

(52) U.S. Cl.
CPC ............... *B23P 6/04* (2013.01); *B23K 26/0066* (2013.01); *B23K 26/127* (2013.01);
(Continued)

(58) Field of Classification Search
CPC ....... B23P 6/04; B23P 6/007; B23K 26/1224; B23K 26/127; B23K 26/0066; B23K 2203/06; C23C 24/04; C23C 24/08–24/106; C23C 30/00–30/005; Y10T 29/49746; B22F 3/115
See application file for complete search history.

(56) References Cited

U.S. PATENT DOCUMENTS 5,817,372 A    10/1998   Zheng
2006/0045785 A1*   3/2006   Hu .......................... B23P 6/007
                                                                          419/5

(Continued)

FOREIGN PATENT DOCUMENTS

CN    1800447    7/2006
CN    1854344    11/2006
(Continued)

OTHER PUBLICATIONS

"Die Europäische Norm EN ISO 945 : 1994 hat den Status einer Deutschen Norm," DIN Deutsches Institut für Normung e.V., 1994, 11 pages.
(Continued)

*Primary Examiner* — David Bryant
*Assistant Examiner* — Jun Yoo
(74) *Attorney, Agent, or Firm* — Slayden Grubert Beard PLLC

(57) ABSTRACT

A method prepares a repair material for and repairs a damage point in the surface of cast parts. Spray particles having the same cast structure as the cast part are used as materials. The particles are applied to the damage point by cold gas spraying. The cold gas spraying is performed such that the spray particles are not melted and, advantageously, the cast structure is retained after the spray particles contact the repair point. The repair point can thus be advantageously furnished with the same properties as the rest of the component to be repaired. The repair material can be produced in that a cast part having the required cast structure is reduced to small pieces.

21 Claims, 2 Drawing Sheets

(51) Int. Cl.
*C23C 24/04* (2006.01)
*B23K 26/00* (2014.01)
*B23K 26/12* (2014.01)
*B22F 3/115* (2006.01)

(52) U.S. Cl.
CPC ............ *B23K 26/1224* (2015.10); *C23C 24/04* (2013.01); *B22F 3/115* (2013.01); *B23K 2203/06* (2013.01); *Y10T 29/49746* (2015.01)

(56) References Cited

U.S. PATENT DOCUMENTS

| | | | |
|---|---|---|---|
| 2006/0090593 A1* | 5/2006 | Liu | B22F 1/0048 75/252 |
| 2006/0134320 A1 | 6/2006 | DeBiccari et al. | |
| 2006/0163323 A1 | 7/2006 | Pietruska et al. | |
| 2006/0255100 A1* | 11/2006 | Payne | C23C 24/04 228/119 |
| 2007/0000129 A1* | 1/2007 | Hahn | C23C 4/02 29/888.011 |
| 2007/0186416 A1 | 8/2007 | Birkner et al. | |
| 2008/0085368 A1* | 4/2008 | Gauthier | C23C 14/28 427/314 |
| 2009/0148622 A1 | 6/2009 | Stoltenhoff et al. | |
| 2009/0297701 A1 | 12/2009 | Jabado et al. | |
| 2010/0068410 A1 | 3/2010 | Jensen et al. | |
| 2010/0126014 A1 | 5/2010 | Gupta et al. | |
| 2012/0258253 A1* | 10/2012 | Helmick | C23C 4/085 427/446 |

FOREIGN PATENT DOCUMENTS

| | | |
|---|---|---|
| CN | 101111630 | 1/2008 |
| CN | 101733610 | 6/2010 |
| DE | 69828732 | 12/2005 |
| DE | 102006003818 | 8/2007 |
| DE | 102006032110 | 1/2008 |
| DE | 102011081998.3 | 9/2011 |
| EP | 1772228 | 4/2007 |
| EP | 1816316 | 8/2007 |
| EP | 1829988 | 9/2007 |
| EP | 1816235 | 3/2011 |
| JP | 7-34214 | 2/1995 |
| WO | 2007/042395 | 4/2007 |
| WO | PCT/EP2012/066395 | 8/2012 |

OTHER PUBLICATIONS

German Office Action for German Priority Patent Application No. 10 2011 081 998.3, issued May 14, 2012, 5 pages.

WIPO English Language Translation of Written Opinion of the International Searching Authority for PCT/EP2012/066395, Downloaded from WIPO Website Mar. 4, 2014, 6 pages.

English Language of International Search Report for PCT/EP2012/066395, mailed Nov. 7, 2012, 3 pages.

Chinese Search Report for related Chinese Patent Application No. 2012800422892, issued Jan. 26, 2015, 2 pages.

* cited by examiner

METHOD FOR REPAIRING A DAMAGE POINT IN A CAST PART AND METHOD FOR PRODUCING A SUITABLE REPAIR MATERIAL

CROSS REFERENCE TO RELATED APPLICATIONS

This application is based on and hereby claims priority to International Application No. PCT/EP2012/066395 filed on Aug. 23, 2012 and German Application No. 10 2011 081 998.3 filed on Sep. 1, 2011, the contents of which are hereby incorporated by reference.

BACKGROUND

The invention relates to a method for repairing a damaged site in the surface of a cast part, in which method a repair material is applied to the damaged site by cold gas spraying. The invention moreover relates to a method for producing a repair material for a component.

Cold gas spraying is a process which is known per se, in which particles intended for the coating are accelerated, preferably to supersonic speed, by a convergent-divergent nozzle, so that they remain adhering to the surface to be coated on account of their impressed kinetic energy. In this respect, the kinetic energy of the particles is utilized, leading to plastic deformation thereof, with the coating particles being melted merely at their surface during impingement. Therefore, this process, compared to other thermal spraying processes, is referred to as cold gas spraying because it is carried out at relatively low temperatures, at which the coating particles remain substantially solid. A cold gas spraying plant having a gas heating device for heating a gas is preferably used for the cold gas spraying, which is also termed kinetic spraying. A stagnation chamber is connected to the gas heating device and, at the outlet side, is connected to the convergent-divergent nozzle, preferably a Laval nozzle. Convergent-divergent nozzles have a convergent partial portion and also a divergent partial portion, these being connected by a nozzle neck. At the outlet, the convergent-divergent nozzle generates a powder jet in the form of a gas stream with particles located therein at high speed, preferably supersonic speed.

According to EP 1 816 235 B1, it is known that imperfections in cast parts can be repaired by cold gas spraying. For this purpose, use is made of materials which are designated as homogeneous as per EP 1 816 235 B1. This is to be understood as meaning materials which have a similar composition to or the same composition as the component to be repaired. This can have the effect that the repaired site is filled with a material which virtually completely precludes metallurgical problems. This means that it is possible to preclude diffusion processes, which arise after a repair has been made to a cast part using a material of a different type, particularly in the case of components subject to high thermal loading, and lead to a reduction in the integrity of the microstructure. Specifically, in the worst case these can lead to component failure.

However, the homogeneous material for repairing the imperfections in the cast part forms a microstructure which, in terms of its microstructure, is different from the cast microstructure of the surrounding component.

SUMMARY

It is one potential object to specify a method for repairing cast parts which makes it possible to produce a repair site that is adapted, to the greatest extent possible, to the properties of the cast part surrounding the repair site. Moreover, it is a potential object to specify a method for producing a repair material which can achieve the object mentioned first upon application in a repair method.

The inventors propose a repair method in which spray particles having the same microstructure as the cast part are used as the repair material. In this respect, by using cold gas spraying, the method makes use of the fact that the particles processed by cold gas spraying are not melted, and therefore, even after formation of the layer (in this case the repair site), at least substantially retain the microstructure which the processed spray particles have. It is therefore possible to use spray particles which have the same cast microstructure as the component to be repaired, and in this way to produce a repair site with precisely that cast microstructure which the cast part surrounding the repair site also has. It is thereby advantageously possible to achieve a repair to cast parts in which the repaired cast part has virtually the same properties as the original part, since the repair site also has exactly the same properties as the rest of the cast part. Therefore, the properties of the cast part to be repaired advantageously remain identical to the original part. A component repaired in the manner proposed is also protected from corrosive attacks, which might arise on account of the formation of electrical local elements if the repair material, despite having the same composition, is more noble or less noble than the material surrounding the cast part on account of a different alloy formation.

In order to produce a repair material which can be processed in the indicated manner, the inventors propose a method for producing a repair material, in which the component to be repaired is a cast part and the repair material is obtained by comminuting a body made of that material of which the cast part is formed. Moreover, this body has the same cast microstructure as the cast part. By way of example, the body can be formed of spent cast parts from the same production batch as the cast part to be repaired. This ensures that the material of the body precisely corresponds to that of the cast part even in terms of the microstructure quality. Another possibility is that, before the comminution, the body is produced especially for this purpose. In this respect, it is advantageously possible to select body shapes which make it possible to achieve unproblematic production of the body with a cast microstructure that is unimpaired to the greatest possible extent.

By way of example, bodies with a particularly simple geometrical structure, for example bars, are particularly suitable as bodies for the subsequent comminution. It is also possible to remove the edge zone of the body produced by a chip-forming process, and therefore to obtain a body which includes only the inner zones of the cast part produced. In this region, the microstructure of the body is advantageously impaired to the smallest extent by the processes which proceed during solidification of the cast part. The body can be comminuted, for example, by shredding and/or grinding. This makes it possible to produce spray particles for cold gas spraying in which different particle sizes can be realized.

According to one configuration, it is provided that the spray particles have a mean diameter of at least 100 μm and at most 200 μm. These particle sizes can advantageously be processed particularly easily by cold gas spraying. It is moreover advantageous if the distribution of the different mean diameters of the spray particles extends at least over half the range indicated above. This provides a spray material of spray particles having different mean diameters, and therefore these particles can advantageously congregate to form a relatively dense layer, in which spray particles having a relatively small mean diameter can fill the interstices between the particles having a relatively large mean diameter.

According to another configuration, it is provided that the damaged site of the cast part is heated during the application of the spray particles. This can be effected in particular by local irradiation by a laser beam. Preheating of the cast part can have the effect that the latter expands in the region of the damaged site to be repaired and a relatively low-stress join is achieved during subsequent cooling both of the repair site of the spray particles and of the material surrounding the cast part. In addition, according to a further configuration, the cast part can also be subjected to subsequent heat treatment after application of the repair material.

During heat treatments or the heating of the repair site, it must be ensured that the temperatures which are reached do not alter the cast microstructure. The cast part is thereby prevented from altering its properties owing to the repair, since precisely this circumstance is to be prevented by the repair method.

It is particularly advantageous if the cast part is formed of globular gray cast iron. The microstructure of globular gray cast iron can advantageously be readily produced by the method for producing a repair material. During the production of the spray particles, it must be ensured that the globular carbon inclusions in the microstructure of the spray particles have almost exclusively a diameter of 10 to 150 μm in accordance with the standard DIN EN ISO 945. Therefore, the spray particles should have at least a mean diameter of 100 μm, so that the microstructure of gray cast iron can still be recreated by the cold gas spraying by the spray particles. It becomes apparent that even larger carbon inclusions are then also reliably enclosed at least partially by the gray cast iron matrix microstructure, and can be effectively processed as spray powders. GJS 400-15 can serve, for example, as the alloy for the gray cast iron.

It is also possible to repair components which are formed of cast iron containing laminar carbon. This applies, for example, to the EN GJL materials group. Here, too, it holds true that, owing to the arising lengths of the carbon lamellae of 10 to 250 μm (in accordance with DIN EN ISO 945, this size range applies to the greatest part of the carbon inclusions), the spray particles should have a mean diameter of 100 to 200 μm, in order that the microstructure of the cast material can be recreated by the cold gas spraying. Here, too, it holds true that the carbon inclusions are then also reliably enclosed at least partially by the gray cast iron matrix microstructure.

Furthermore, the cast parts can also be formed, for example, of aluminum-silicon alloys, for example of AlSi 17.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
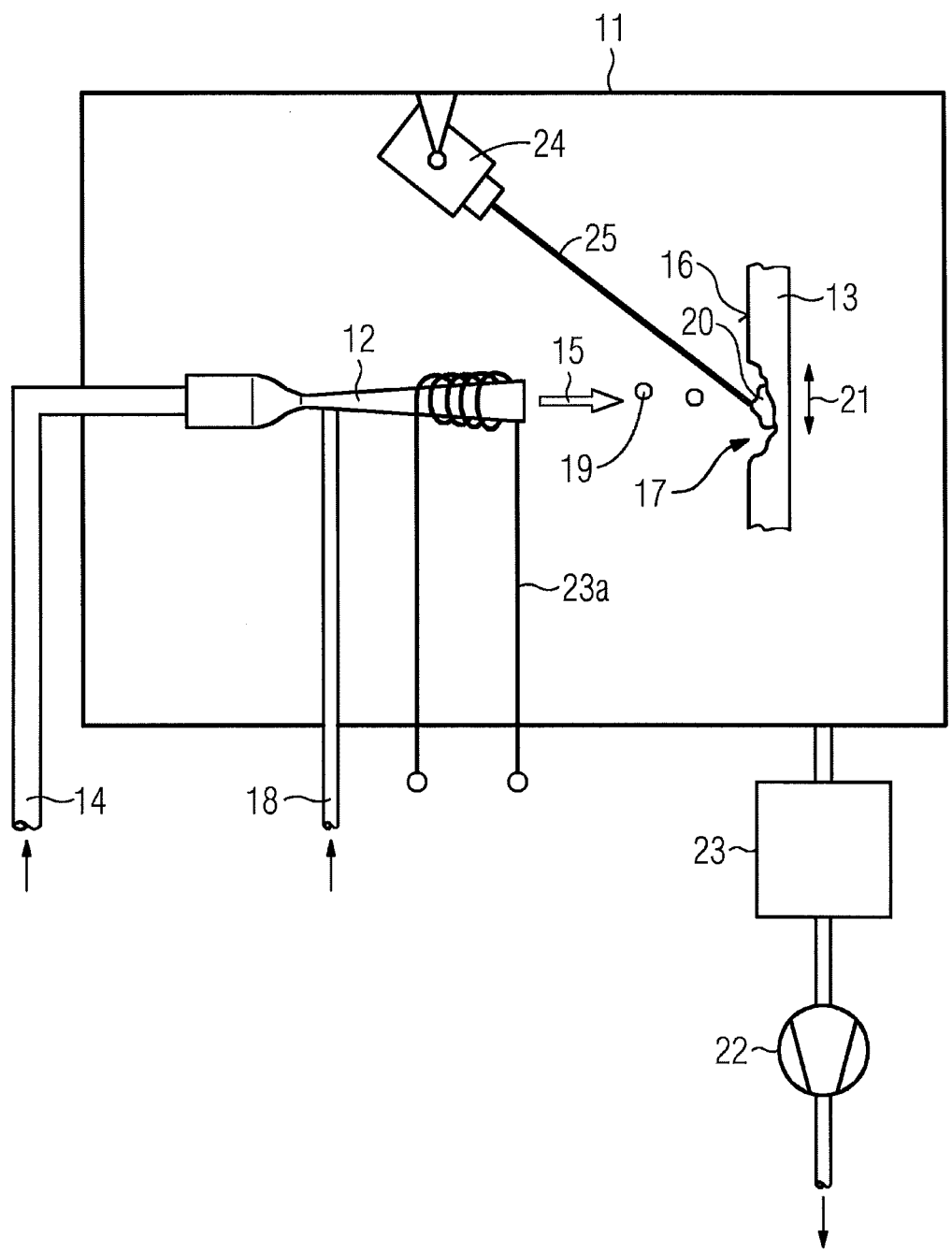
FIG. 1 shows an exemplary embodiment of the proposed method for repairing a cast part, as a schematic side view.

Reference will now be made in detail to the preferred embodiments of the present invention, examples of which are illustrated in the accompanying drawings, wherein like reference numerals refer to like elements throughout.

FIG. 1 shows an apparatus for cold gas spraying. This has a vacuum chamber 11, in which there are arranged firstly a cold gas spray nozzle 12 and secondly a cast part 13 (fastening not shown in more detail). A process gas can be supplied to the cold gas spray nozzle 12 through a first line 14. As indicated by the contour, said nozzle is in the form of a convergent-divergent nozzle (for example of a Laval nozzle), through which the process gas is made to expand and accelerated in the form of a gas jet (arrow 15) toward a surface 16 of the cast part 13.

Furthermore, the process gas can be heated (in a manner not shown), as a result of which a required process temperature is set in the vacuum chamber 12.

Spray particles 19 can be fed to the cold gas spray nozzle 12 through a second line 18, are accelerated in the gas jet 15 and impinge on the surface 16 in the region of a damaged site 17 to be repaired. The kinetic energy of the spray particles leads to adhesion of the latter on the surface 16. To form a repair microstructure 20 in the damaged site 17, the cast part 13 can be moved back and forth in the direction of the double-headed arrow 21 in front of the cold gas spray gun 12. During this coating process, the vacuum in the vacuum chamber 11 is maintained constantly by a vacuum pump 22, the process gas, before being led through the vacuum pump 22, being guided through a filter 23 in order to filter out particles which have not bonded to the surface 16 upon impingement thereon.

The particles 19 can be additionally heated within the cold gas spray nozzle by a heating device 23a. This causes an additional introduction of energy, which is supplied directly as thermal energy or, by expansion in the cold gas spray nozzle 12, in the form of kinetic energy to the spray particles 19. As a further energy source, a laser 24 is installed in the vacuum chamber 11, and is directed at the site at which the cold jet 15 impinges on the surface 16 of the cast part 13. At the site of impingement, the electromagnetic energy of the laser beam 25, in conjunction with the kinetic and possibly thermal energy of the spray particles 19, ensures permanent adhesion of the spray particles 19 on the surface 16, as a result of which the repair microstructure 20 is formed.

Figure 2:
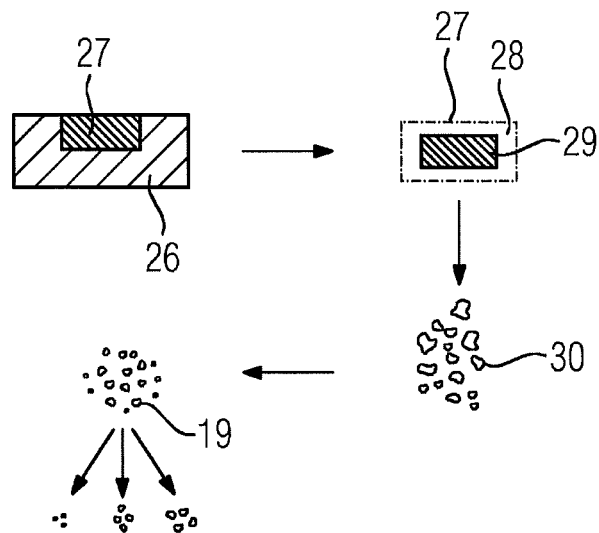
FIG. 2 shows an exemplary embodiment of the method for producing a repair material, by an exemplary illustration of selected portions of the method.

FIG. 2 shows a method for producing the repair material. Firstly, an ingot 27, which is intended to serve as a blank (body) for the production of the spray particles 19, is produced in a casting mold 26. This ingot 27 is removed from the mold after solidification of the cast part, and a surface layer 28 is removed from the ingot 27 with chip forming, so that a core 29 remains. Regions of the ingot 27 which are close to the surface, which may have inhomogeneities in the cast microstructure or chemical variations on account of the influence of the ambient air, are thus discarded. The core 29 is then shredded in a device (not shown in more detail), as a result of which coarse particles 30 are formed. These particles 30 are then ground in a ball mill, for example, as a result of which further comminution is effected and the production of the spray particles is ended. Subsequently, these spray particles can also be classified according to sizes, in order to then produce spray powders in different classes of size of the spray particles. For the production of spray powders in which the spray particles have different mean diameters over a certain range, the various classes of size of the spray particles can be mixed in a suitable manner.

In this context, it is advised that the mean diameter of a spray particle is to be understood as meaning a diameter which corresponds to the diameter of a spherical particle, where this spherical particle should have the same volume as the actual particle, which usually deviates from the spherical shape. The mean diameter is accordingly not understood to mean the average diameter of a relatively large number of particles. If reference is made to different mean diameters of the spray particles in conjunction with this invention, this therefore means that spray particles of different classes of size are present in mixed form.

Figure 3:
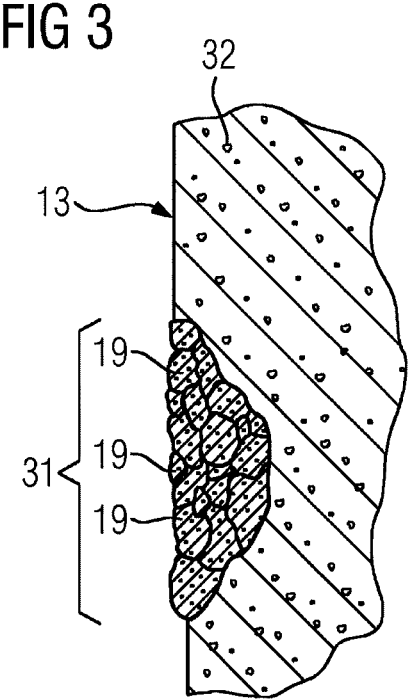
FIG. 3 shows an exemplary embodiment of a component repaired by the repair method, in section.

FIG. 3, which shows a section through a repaired cast part 13, shows that the use of spray particles 19 of different classes of size (i.e. with different mean diameters) advantageously has the effect that a dense microstructure is formed in the repair site 31 of the cast part 13.

FIG. 3 shows a cast part made of globular gray cast iron, where globular carbon 32 is distributed in the matrix made of an iron material. This also applies to the spray particles 19, the size of each of which can also be seen in FIG. 3, since these are shown individually. Here, relatively small spray particles 19 fill the interstices between relatively large spray particles 19. In reality, the surfaces of the spray particles 19 coalesce owing to the evolution of thermal energy upon impact of the spray particles, and therefore the boundaries between the particles as shown in FIG. 3 are partially abolished.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 68 USPQ2d 1865 (Fed. Cir. 2004).

The invention claimed is:

1. A method for repairing a damaged site in a surface of a cast part, comprising:
   providing a cast body made of a material of which the cast part is formed;
   comminuting the cast body to produce a repair material comprised of spray particles having a same cast microstructure as the cast part; and
   applying the repair material to the damaged site by cold gas spraying.

2. The method as claimed in claim 1,
   wherein a distribution of the diameters of the spray particles has a mean diameter of at least 100 μm and at most 200 μm.

3. The method as claimed in claim 2, wherein a width of the distribution is at least half the range indicated in claim 2.

4. The method as claimed in claim 3, further comprising heating the damaged site while applying the repair material.

5. The method as claimed in claim 4, further comprising heat treating the cast part after applying the repair material.

6. The method as claimed in claim 5,
   wherein the cast part is formed of globular gray cast iron or aluminum-silicon.

7. The method as claimed in claim 1, further comprising heating the damaged site while applying the repair material.

8. The method as claimed in claim 7, further comprising irradiating the damaged site with a laser beam.

9. The method as claimed in claim 1, further comprising heat treating the cast part after applying the repair material.

10. The method as claimed in claim 1, wherein the cast part is formed of globular gray cast iron.

11. The method as claimed in claim 1,
    wherein the comminuting is selected from the group consisting of shredding and grinding.

12. A method comprising:
    casting a cast part;
    casting a body made of a material of which the cast part is formed; and
    comminuting the body to produce a repair material comprised of spray particles having a same cast microstructure as the cast part; and
    using cold gas spraying to apply the repair material to a damaged site in a surface of the cast part.

13. The method as claimed in claim 12,
    wherein the comminuting is selected from the group consisting of shredding and grinding.

14. The method as claimed in claim 12, further comprising irradiating the damaged site with a laser beam.

15. The method as claimed in claim 12, further comprising heating the damaged site while applying the repair material.

16. The method as claimed in claim 12, further comprising heat treating the cast part after applying the repair material.

17. The method as claimed in claim 12,
    wherein the cast part is formed of globular gray cast iron or aluminum-silicon.

18. A method for repairing a damaged site in a surface of a cast part, comprising:
    casting a body and the cast part in a same production run;
    comminuting the body to produce spray particles; and
    repairing the damaged site with the spray particles by cold gas spraying.

19. The method as claimed in claim 18, further comprising removing an edge zone from the body before the comminuting.

20. The method as claimed in claim 18, wherein a material of the cast part is selected from the group consisting of globular gray iron, laminar-carbon gray iron, and aluminum-silicon.

21. The method as claimed in claim 18, wherein a kinetic energy of the spray particles causes the spray particles to adhere to the damaged site.

* * * * *